United States Patent [19]

Dyer

[11] 4,297,184

[45] Oct. 27, 1981

[54] METHOD OF ETCHING ALUMINUM

[75] Inventor: Christopher K. Dyer, Summit, N.J.

[73] Assignee: United Chemi-Con, Inc., Rosemont, Ill.

[21] Appl. No.: 122,460

[22] Filed: Feb. 19, 1980

[51] Int. Cl.³ .............................................. C25F 3/04
[52] U.S. Cl. ............................. 204/129.4; 204/129.43; 204/DIG. 9; 204/129.75
[58] Field of Search .......... 204/129.4, 129.43, DIG. 9

[56] References Cited

U.S. PATENT DOCUMENTS

| | | | |
|---|---|---|---|
| 2,930,741 | 3/1960 | Burger et al. | 204/129.43 X |
| 3,193,485 | 7/1965 | Vincent | 204/DIG. 9 |
| 3,477,929 | 11/1969 | Namikata et al. | 204/129.43 |
| 3,520,788 | 7/1970 | Paehr | 204/129.43 |
| 4,072,589 | 2/1978 | Golda et al. | 204/129.4 |
| 4,087,341 | 5/1978 | Takahashi et al. | 204/129.43 |
| 4,140,599 | 2/1979 | Yamasaki et al. | 204/129.43 |

Primary Examiner—Donald R. Valentine
Attorney, Agent, or Firm—Mason, Kolehmainen, Rathburn & Wyss

[57] ABSTRACT

A method of etching aluminum by applying an alternating electric current to aluminum which is in contact with an electrolyte containing hydrochloric acid, in which the alternating current has a symmetrical waveform wherein the current rises rapidly from zero to a maximum, then subsequently decreases rapidly in a first stage to an intermediate value which is about one-third to about one-half of the maximum, and thereafter decreases more slowly to zero in a second stage. Thereafter the current rises and falls in the opposite direction with the same waveform. The ratio of time of the second stage to time of the first stage of the waveform is in the range from 1 to 6. By this procedure higher capacitance values of the etched aluminum are obtained in comparison to prior procedures.

7 Claims, 7 Drawing Figures

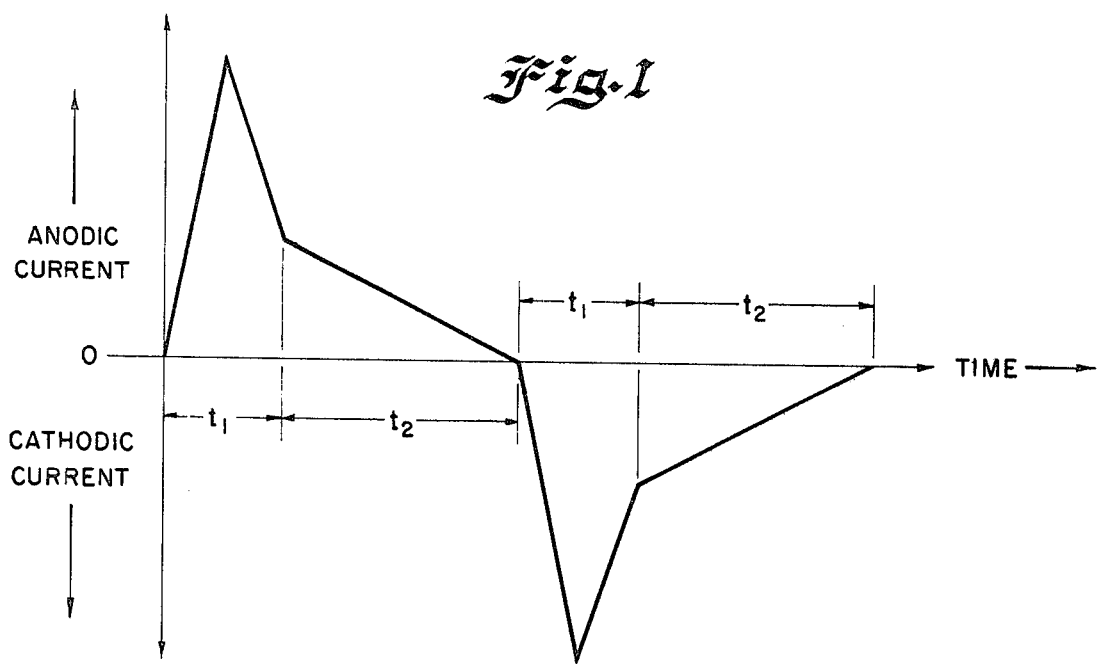
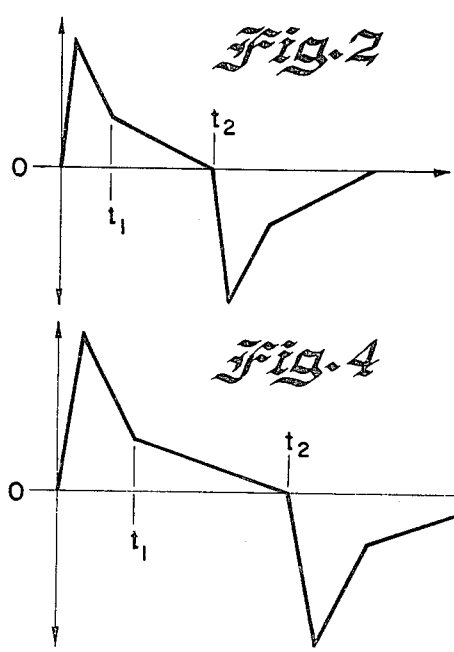
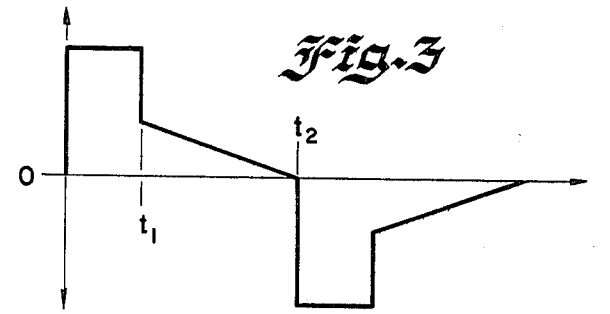
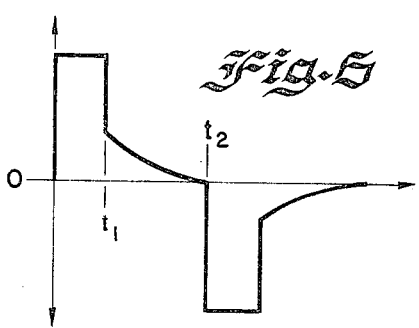
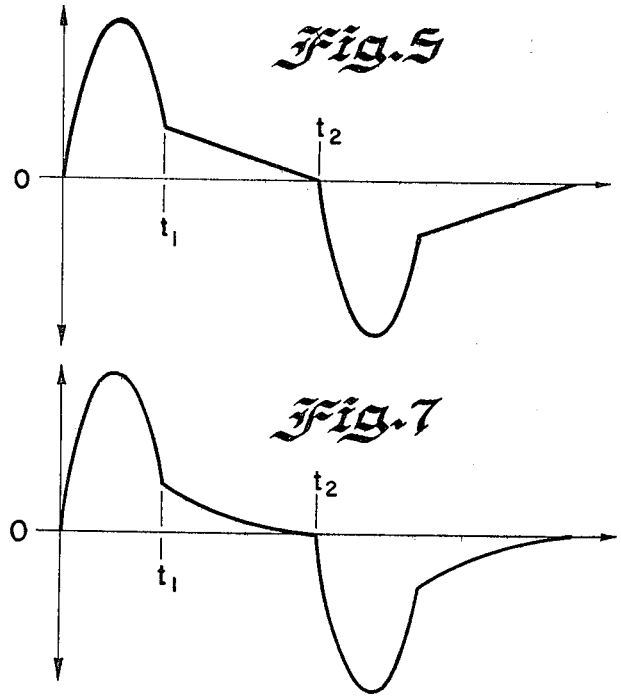

METHOD OF ETCHING ALUMINUM

This invention relates to the electrolytic etching of aluminum, particularly aluminum foil. More particularly this invention relates to a procedure for electrolytic etching of aluminum with an alternating current of special wave shape.

BACKGROUND OF THE INVENTION

It is common practice to electrochemically etch aluminum foil to increase the surface area thereof for capacitor electrodes. In the United States and Europe this is usually done with direct current while in Japan it is commonly done with alternating current. A modified type of direct current called pulsating or ripple direct current has also been used. With this type of current a particular wave shape is superimposed on a steady direct current.

Most of the prior art patents on alternating current electrochemical etching of aluminum do not specify wave shape or frequency of the current, giving rise to the implication that the use of ordinary line current at 50 or 60 hz is suitable, although recently a Japanese process has been reported with low frequency alternating current of 3 to 30 hz.

THE PRIOR ART

U.S. Pat. No. 4,087,341 to Takahaski et al. shows an asymmetrical, sinusoidal voltage wave form wherein the voltage is applied with a higher anodic voltage than the cathodic voltage. The ratio of cathodic coulombic input to anodic coulombic input is in the range of 0.3–0.8.

U.S. Pat. No. 3,193,485 to Vincent shows a voltage wave form having a positive going portion separated by a short negative going portion of considerably less amplitude than the positive going portion.

U.S. Pat. No. 3,294,523 to Post et al describes a direct current etching procedure with a pulsating degree of below 50%, but at least 5%.

U.S. Pat. No. 3,520,788 to Paehr relates to an etching procedure DC voltage pulse to effectively interrupt the etching current for a short period between the major pulses.

Three patents to Inoue (U.S. Pat. Nos. 3,616,343; 3,616,346; 3,654,116) show many wave forms for electrochemical machining. The general method of these patents is to apply steep wave front pulses of one polarity spaced by intervals during which opposite polarity pulses are applied. The opposite polarity pulses are of short duration but of duration and amplitude sufficient to electrochemically destroy a passivation film formed during the first polarity pulse. The specific position of the negative going pulse in the interval between the positive going pulse is a matter of design. FIG. 5 of U.S. Pat. No. 3,616,346 show a variety of ramps superimposed on square waves to compensate for the passivation effect illustrated in FIG. 4.

U.S. Pat. No. 3,294,666 to Wiersma shows in FIG. 3 a wave form e which has alternating DC pulses with a zero portion between the alternation. U.S. Pat. No. 2,901,412 to Mostovych et al and U.S. Pat. No. 3,892,636 to Kaneda et al show specific wave forms directed to the anodizing or coloration of aluminum surfaces. U.S. Pat. No. 2,930,741 to Burger et al describes electrolytic etching with pulsating direct current of appropriate degree of pulsation.

An article entitled "Revealing Dislocation Structure by Electrolytic Etching with a Periodic Current", Industrial Laboratory, Vol. 41, No. 7, pp. 1054–1056, July 1975, shows a generator in FIG. 1 for electrolytic etching using a pulsing single polarity half-cycle wave form of FIG. 1B a portion of the wave form of FIG. 1B in FIG. 1C and a periodic wave form in FIG. 1D wherein the reverse pulse which is considered in the disclosure, the anodic portion of the cycle, having less area under the curve than the positive or cathodic portion of the curve.

BRIEF DESCRIPTION OF DRAWING

The invention is further disclosed by the attached drawing wherein each of the seven figures represents a wave form of the type used in this invention. The wave above the zero line represents anodic current and the wave below the zero line represents cathodic current, both plotted against time.

GENERAL DESCRIPTION OF THE INVENTION

The present invention concerns the electrolytic etching of aluminum foil by use of alternating current of special, unusual wave shape. The capacitance of the aluminum foil so etched is much greater than that of the aluminum foil prior to the etching and is superior to that of aluminum foil etched by prior procedures. The particular wave shapes of the alternating current in the electrolytic etching operation have been found to give higher capacitance than sine, square or triangular wave shapes used in the prior art in an acid chloride-containing electrolyte.

A representative alternating current wave shape used in this invention is illustrated in FIG. 1 of the drawing. The complete wave consists of two half cycles of equal time and peak height with equal areas under each curve. In this wave each anodic or cathodic half cycle can be regarded as subdivided into two stages. Stage 1 consists of an increasing then decreasing current extending over the time period represented by $t_1$ and is followed by stage 2 in which the current decreases at a slower rate than in stage 1, extending over the time period represented by $t_2$. FIGS. 3, 5, 6 and 7 illustrate similar wave forms based on square and sine waves.

By use of the alternating current of the aforementioned wave shape the capacitance of the aluminum foil is higher than the capacitance obtained with any square, since or saw-tooth wave current used in the same electrolyte for the same total anodic, coulombic charge. In this specification saw-tooth means a wave shape with only two slopes or gradients of changes of current in each half cycle.

Prior to this invention no one had conducted electrolytic etching with special wave forms of the type described herein. The waves utilized in the present invention have symmetrical shapes and equal anodic and cathodic charges. They have a distinctive shape wherein the first part of the wave is characterized by a rapid rise and then a rapid decrease in current and then an abrupt change in the decreasing current which is evidenced by a tail of slowly decreasing current to zero, followed by the same wave pattern of current in the opposite direction.

A preferred form of the wave shape is illustrated in FIG. 1 which shows an anodic current rapidly rising from zero to a maximum then falling rapidly to point $t_1$ on the time scale at which the current shows a substantial and significant decrease in rate so that the current decreases to zero over a prolonged period of time which is represented by $t_2$ on the time scale. The decrease in current in the first stage (within the time period represented by $t_1$) from the maximum to the value at $t_1$ is to approximately one-quarter to one-half the peak value. In the second stage (beginning at $t_1$) with the more slowly decreasing current, the time required for the current to decrease to zero is represented by $t_2$. The ratio of the time of stage 2 to the time of stage 1, that is the ratio of $t_2/t_1$, is between 1 and 6, and preferably from 1 to 3.

The other figures of the drawing represent other suitable wave shapes. FIG. 2 shows a wave in which the current in the first stage rises rapidly to a peak then declines less rapidly to time $t_1$. Thereafter the second stage of more slowly declining current occurs.

FIG. 3 illustrates a square wave in the first stage, followed by a second stage of regularly decreasing current to zero.

FIG. 4 shows a wave form similar to that of FIG. 2, the main difference being that the time required for the second stage is much longer in FIG. 4 than in FIG. 2; in addition the rate of current decrease in the first stage of FIG. 4 is lower than that of FIG. 2.

FIG. 5 illustrates a sine wave form in the first stage, with regularly decreasing current in the second stage.

FIG. 6 shows a square wave form in the first stage and a second stage with current declining at a nonuniform rate commencing at $t_1$ and reaching zero, represented by a curve.

FIG. 7 illustrates a sine wave form in the first stage and a second stage with current declining at a nonuniform rate over the time period between $t_1$ and $t_2$.

The particular wave form with two rates of decreasing current provides an alternating current system for etching or electrograining aluminum which is at least 10% more efficient than other alternating current wave forms used with the same aluminum and the same etchant at the same temperature and time conditions.

The time required for the wave to reach a maximum can vary from nearly zero to about 60% of $t_1$, depending upon the design of the power supply and the wave shape. For an initial square wave pulse the time required to reach a maximum is essentially zero (see FIGS. 3 and 5), while with a triangular wave the time may be increased to 20%–60% of $t_1$ (see FIGS. 1, 2 and 4). With triangular waves the time for the current to reach a maximum is usually 25–50% of $t_1$.

The decreasing current of stage 2 may be represented linearly as in FIG. 1 or curved as in FIG. 7, again depending on power supply design. The important feature is that the decreasing wave be in two stages, the first relatively fast and the second relatively slow, decreasing to zero.

The etchant in which the electrolysis is conducted is a hydrochloric acid solution, preferably containing other acids such as oxalic, phosphoric and sulfuric. The preferred etchant contains hydrochloric acid of normality 0.5 to 2.5, nitric acid of 0.05 to 0.25, normality phosphoric acid 0.05 to 0.25 N and sulfuric acid $1-3 \times 10^{-3}$ N. As the etching operation proceeds, aluminum quickly becomes dissolved in the acid etchant thus providing aluminum ions. The aluminum chloride concentration in the etchant is preferably at a normality of about 0.5 to 1.0, with a maximum of about 3 N. The practical operating parameters for the etching operation are a temperature in the range of 38° to 50° C., a frequency of 15–25 hertz and a current density of 100–300 milliamperes (r.m.s.) per square centimeter.

GENERAL LABORATORY PROCEDURE FOR ETCHING

An aluminum foil specimen is mounted in a suitable holder. The area exposed for etching may be 1, 5 or 10 cm$^2$. A small carbon rod or platinum foil is used as the counterelectrode. Electrical connections are made to the foil specimen and the counterelectrode. The etchant is prepared by mixing suitable volumes of concentrated reagent grade acids, aluminum chloride and distilled water. In typical operations, the etchant contained 1.0 N HCl, 0.10 N HNO$_3$, 0.20 N H$_3$PO$_4$ and 0.0015 N H$_2$SO$_4$ and 0.8 N AlCl$_3$ in distilled water. Etchant temperature control and circulation are provided by pumping the etchant through a temperature-controlled oil bath or by use of a magnetic stirrer and regulated immersion heater; the temperature in this run is maintained in the range of 40°–50° C.

The electrical current is from a potentiostat wired as a bi-directional current source. An external input signal to the potentiostat from a digital waveform generator shapes the current output with the desired waveshape. Before a run is started the connections to the etch cell are shorted and the required cell current is set by adjusting the voltage level of the waveform generator. This operation is monitored with an oscilloscope. The current is then shut off, connections made to the cell, the specimen immersed in the etchant, and the current turned on for a time calculated to give the desired etch charge. The specimen is removed from the holder, thoroughly rinsed in water, and then the oxide dielectric film is formed in any one of several electrolytic baths known in the art. This is conveniently carried out by making the etched aluminum foil the anode in a nonreactive electrolyte containing borate or phosphate ions and applying direct current. This produces a dense aluminum oxide film on the foil with high dielectric constant.

In some commercial AC etching operations and in some small-scale etching procedures there is no direct electrical connection to the aluminum foil to be etched. Instead, the foil serves as a separator between two electrode compartments and the electrical connections are made to carbon electrodes in these compartments. As the electricity passes through the foil between compartments it causes alternating anodic and cathodic reactions on each side of the aluminum. This contactless etching procedure and the contact etching operation described above are electrically equivalent, and both can be used in the present invention.

EXAMPLE 1

An aluminum foil (99.99% Al, 0-temper, 10 cm$^2$, 100 μm thick) was etched by the general procedure described above in an electrolyte of the following composition:

| Component | Normality |
|---|---|
| HCl | 0.87 |
| HNO$_3$ | 0.12 |
| H$_3$PO$_4$ | 0.22 |
| H$_2$SO$_4$ | 0.0015 |
| AlCl$_3$ | 0.90 |

The charge density was 54 C/cm². The capacitances were measured at 120 Hz after forming anodic barrier oxide films at 20 V and 64 V. After optimizing temperature, current density and frequency, the highest capacitances obtained with sine and square waves were as follows:

| Shape | T (°C.) | F (Hz) | cd (mA/cm²) | Capacitance (μF/cm²) 20 V | 64 V |
|---|---|---|---|---|---|
| Sine | 41 | 19 | 175 | 18.6 | 4.4 |
| Square | 39 | 22 | 169 | 18.3 | 4.0 |

EXAMPLE 2

This example describes etching procedures with waveshapes corresponding to FIGS. 1 and 3 of the drawing, with the same materials described in Example 1. The waveshape of FIG. 1, in which $t_2/t_1 = 2.0$, tested at 40° C., with a charge of 54 C/cm², at 16.7 to 16.8 Hz, and a peak current density of 500 mA/cm² on a foil of 1 sq. cm gave a capacitance of 21.5 μF/cm² at 20 V and 4.7 μF/cm² at 64 V. This waveshape gave 15% higher capacitance at 20 V than a sine wave and 7% higher at 64 V, all other conditions being the same.

The waveshape of FIG. 3, in which $t_2/t_1 = 2.0$, at 16.8 Hz and 40° C. gave capacitance values of 20.5 μF/cm² at 20 V and 5.3 μF/cm² at 64 V. At 64 V this waveshape results in a capacitance 20% higher than that for a sine wave under the same conditions.

EXAMPLE 3

In this example, the waveshape of FIG. 3 was used with the same etchant, temperature total charge, frequency, as in Example 2, second paragraph. Current density during $t_1$ was varied to keep the charge during $t_1$ constant and equal to the charge during $t_1$ in Example 2, first paragraph. The following results were obtained:

| cd ($t_1$) (mA/cm²) | $t_2/t_1$ | Cap (μF/cm²) 20V | 64V |
|---|---|---|---|
| 309 | 2.0 | 20.5 | 5.3 |
| 515 | 4.0 | 20.2 | 4.5 |

EXAMPLE 4

The waveshape of FIG. 1 was used with the same etchant, temperature and total charge of Example 2, second paragraph, but with varied $t_2/t_1$, frequency, peak cd.

| $t_2/t_1$ | Freq. | pk cd | Cap (μF/cm²) 20V | 64V |
|---|---|---|---|---|
| 1.0 | 20.0 | 500 | 19.3 | 4.3 |
| 1.4 | 16.8 | 500 | 19.8 | 4.2 |
| 3.8 | 16.8 | 500 | 17.6 | 4.7 |
| 3.8 | 16.8 | 600 | 19.0 | 3.8 |

At each condition there was an improvement over sine wave results at either 20 V or 64 V.

I claim:

1. In a method of etching aluminum by applying an alternating electric current to aluminum which is in contact with an electrolyte containing hydrochloric acid, the improvement in which the alternating current has a wave form wherein the current rises rapidly from zero to a maximum, then subsequently decreases rapidly in a first stage to an intermediate value which is about one-third to about one-half of the maximum, and thereafter decreases more slowly to zero in a second stage, the ratio of time of the second stage to time of the first stage being in the range from 1 to 6, whereby higher capacitance values of the etched aluminum are obtained.

2. The method of claim 1 wherein the ratio of the second stage to the first stage is in the range from 1 to 3.

3. The method of claims 1 or 2 wherein the waveform of the first stage of current is a triangular wave.

4. The method of claims 1 or 2 wherein the waveform of the first stage of current is a sine wave.

5. The method of claims 1 or 2 wherein the waveform of the first stage of current is a square wave.

6. The method of claims 1 or 2 wherein the current density is in the range from 100 to 300 milliamperes (rms) per square centimeter of aluminum.

7. The method of claim 1 or 2 wherein the frequency of the alternating current is in the range from 15 to 25 hertz.

* * * * *